(12) United States Patent
Lugstein et al.

(10) Patent No.: US 7,074,340 B2
(45) Date of Patent: *Jul. 11, 2006

(54) METHOD FOR PRODUCING A DEVICE FOR SIMULTANEOUSLY CARRYING OUT AN ELECTROCHEMICAL AND A TOPOGRAPHICAL NEAR-FIELD MICROSCOPY

(75) Inventors: Alois Lugstein, Vienna (AT);
Emmerich Bertagnolli, Vienna (AT);
Christine Kranz, Atlanta, GA (US);
Boris Mizaikoff, Atlanta, GA (US)

(73) Assignee: Innovationsagentur Gesellschaft, Wein (AT)

( * ) Notice: Subject to any disclaimer, the term of this patent is extended or adjusted under 35 U.S.C. 154(b) by 25 days.

This patent is subject to a terminal disclaimer.

(21) Appl. No.: 10/297,562

(22) PCT Filed: Jun. 11, 2001

(86) PCT No.: PCT/AT01/00191

§ 371 (c)(1),
(2), (4) Date: Apr. 9, 2003

(87) PCT Pub. No.: WO01/94926

PCT Pub. Date: Dec. 13, 2001

(65) Prior Publication Data

US 2003/0190425 A1 Oct. 9, 2003

(30) Foreign Application Priority Data

Jun. 9, 2000 (AT) .................................. 1011/2000

(51) Int. Cl.
*B44C 1/22* (2006.01)
*G01N 23/00* (2006.01)

(52) U.S. Cl. .......................... 216/11; 216/66; 438/712; 427/585; 250/234; 250/306; 250/307; 73/105
(58) Field of Classification Search ................. 216/11, 216/66; 438/712; 427/585; 250/234, 306, 250/307; 73/105
See application file for complete search history.

(56) References Cited

U.S. PATENT DOCUMENTS

| | | | | |
|---|---|---|---|---|
| 5,838,005 A | * | 11/1998 | Majumdar et al. | 250/306 |
| 5,936,237 A | | 8/1999 | Van der Weide | 250/234 |
| 5,936,243 A | * | 8/1999 | Gibson et al. | 250/306 |
| 5,965,218 A | * | 10/1999 | Bothra et al. | 427/578 |
| 5,969,238 A | * | 10/1999 | Fischer | 73/105 |
| 6,034,348 A | * | 3/2000 | Kim et al. | 219/121.68 |
| 6,703,614 B1 | * | 3/2004 | Stifter et al. | 250/306 |
| 6,894,272 B1 | * | 5/2005 | Kranz et al. | 250/234 |

OTHER PUBLICATIONS

Bard et al., "Chemical imaging of surfaces with the scanning electrochemical microscope," *Science*, 254:68-74, 1991.
Borgwarth et al., "Scanning electrochemical microscopy: a new scanning mode based on convective effects," *Berichte Der Bunsen-Gesellschaft—Physical Chemistry Chemical Physics*, 98:1317, 1994.

(Continued)

*Primary Examiner*—Shamim Ahmed
(74) *Attorney, Agent, or Firm*—Fulbright & Jaworski L.L.P.

(57) ABSTRACT

A method of producing a device for simultaneously carrying out an electrochemical and a topographical near field microscopy is disclosed, which is characterized in that a probe suitable for topographic near field microscopy is covered by a conductive material, the conductive material is covered by an insulating layer, and the conductive material and the insulating layer are removed in the region of the immediate tip of the probe.

26 Claims, 7 Drawing Sheets

OTHER PUBLICATIONS

Bottomley, "Scanning probe microscopy," *Anal. Chem*, 70:452R-475R, 1998.

James et al., "Scanning electrochemical microscopy with simultaneous independent topography," *J. Electrochem. Soc.*, 145(4):L64-L66, 1998.

Ludwig et al., "Topography feedback mechanism for the scanning electrochemical microscope based on hydrodynamic forces between tip and sample," *Rev. Sci. Instrum.*, 66(4):2857-2860, 1995.

Macpherson and Unwin, "Combined scanning electrochemical—atomic force microscopy," *Anal. Chem.*, 72:276-285, 2000.

Matsui and Ochiai, "Focused ion beam applications to solid state devices," *Nanotechnology*, 7:247-258, 1996.

Wipf and Bard, "Scanning electrochemical microscopy. 15. Improvements in imaging via tip-position modulation and lock-in detection," *Anal. Chem.*, 64: 1362-1367, 1992.

* cited by examiner

METHOD FOR PRODUCING A DEVICE FOR SIMULTANEOUSLY CARRYING OUT AN ELECTROCHEMICAL AND A TOPOGRAPHICAL NEAR-FIELD MICROSCOPY

This application is a U.S. national phase application under 35 U.S.C. § 371 of PCT Application No. PCT/AT01/00191 filed 11 Jun. 2001, which claims priority to Austrian Application No. A 1011/2000 filed 9 Jun. 2000.

The present invention relates to a method of producing a device for simultaneously carrying out an electrochemical and a topographical near field microscopy.

The utilization of ultramicroprobes for the laterally resolved characterization of sample surfaces provides quantitative and semi-quantitative data on the size as well as surface activity/surface reactivity, on the kinetics of heterogeneous as well as homogeneous electro-transfer reactions, on corrosion processes, on the activity of biological components and systems (e.g. the quantitation of enzyme activities, the examination of substance transport phenomena on membranes, tissues and tissue parts, metabolic activities of individual cells, cell groups and cell clusters, as well as organ parts and organs), and can also be applied to the large field of the laterally resolved surface modification by means of etching (removal of material) or deposition (application of material).

A prerequisite for this is, however, an exact, reproducible control of the distance between the probe and the sample surface in the range of a few electrode radii. To date, in most of the applications described in the literature, the change in the Faraday current in the near field range, measured at the electrode, has been used for positioning (cf. Bard et al., Science 254 (1991), 68–74).

Since, however, just as previously, in the real experiment, it can be departed neither from an ideal electrode geometry (particularly when the electrodes become very small), nor from an ideally parallel arrangement of the electrode to the sample surface, only a relative determination of the distance between the ultramicroelectrode and the surface is possible.

Since in the conventional experiment the ultramicroelectrode does not only follow the topographical realities, the image obtained of the surface represents an overlaying of the influences of the electrochemical activity and the distance between the sample surface and the probe on the measured Faraday current at the ultramicroelectrode. These overlaying influences increase proportionally to the decrease in the electroactive probe area.

Since a marked improvement in the resolution can only be obtained by using smaller electrodes (<1 µm radius), an alternative distance control must be used.

First approaches to solve this problem are based on a vertical modulation of the electrode, on the one hand, so as to allow for a differentiation between conductive regions with a current increase and non-conductive regions with a current decrease (cf. Wipf et al., Anal. Chem. 64 (1992), 1362–1367). By a logic circuit, the microelectrode can be guided to follow the topography, yet not in the border regions between conductive and non-conductive. On the other hand, the distance control is based on convective effects which, if the probe is quickly moved perpendicularly towards the surface; will lead to changes in the current (cf. Borgwarth et al., Ber. Bunsenges. Phys. Chem. 98 (1994), 1317).

Both methods are furthermore based on a current-dependent signal, and the distance between probe and sample cannot be exactly determined from the approximate curves.

On the other hand, a current-independent height control based on the detection of shearing forces, as has already been used in the scanning near field optical microscopy, could be successfully used for the positioning of microelectrodes. (Ludwig et al., Rev. Sci. Instr. 66 (1995), 2857–2860). The basis of the shearing-force-based height control is the stimulation of the microelectrode to oscillations horizontally to the surface by means of a piezo-element, and the detection of the oscillation damping due to hydrodynamic effects if the probe is made to approach the sample surface.

In U.S. Pat. No. 5,936,237, a combination of electromagnetic and topographical near field microscopy is described. An electrochemical near field microscopy is, however—simply due to the completely different local interactions on which it is based and the structural measures involved for the electrochemical measurement, on the one hand, and the electromagnetic measurement, on the other hand—not possible with the device described therein.

Ludwig et al. describe a current-independent height control based on an optical detection principle. A laser beam focussed on the tip of the probe produces a Fresnel diffraction pattern which is detected at a divided photodiode and amplified by means of a lock-in technique.

Apart from the optical method, also mechanical methods based on a small tuning fork of piezo-electrical material which is fastened on the microelectrode can be utilized for detection of the oscillation (James et al., J. Electrochem. Soc., 145 (1998), L64–L66). In this approach, the oscillation amplitude at the tip of the probe must be chosen to be so small that the electrochemical signal will not be substantially falsified. This precondition simultaneously constitutes the substantial limit for the use of ultramicroelectrodes and, thus, for an improved lateral resolution.

A further approach for an independent topographical recording has been described by Macpherson et al. (Macpherson et al., Anal. Chem., 72 (2000), 276). This is based on the production of microelectrodes whose geometry and properties are adapted to an AFM cantilever. For this purpose, a fine tip is shaped on a platinum wire on one side thereof by etching, and the portion of the wire located therebehind is compressed to be flat. By bending the tip by 90°, an electrode similar to the cantilever is formed which is insulated by means of an electric deposition lacquer, except for the electrode tip.

Due to its elasticity, the flattened portion serves for a distance control, based on the force interaction between sample and probe in the near field region.

With such tips and with the assistance of an AFM device, it has been possible to form sample surfaces, e.g. ultrafiltration membranes, in contact mode. With the approach described, electrodes having a variation width of the electroactive area in the µm and sub-µm-range could be produced, in which, simplified, a hemispheric geometry was assumed and the electro-active area was estimated with the assistance of cyclical voltametry.

However, the essential limits are to be seen both in the type of sample to be examined and in the little reproducible production of the electrochemical probes by the etching and insulating process, as well as in the poor topographical resolution due to the undefined tip geometry, as has been demonstrated by way of the quality of the recorded AFM images with decreasing tip size.

For a significant improvement in the resolution ability for a laterally resolved, electro-chemical characterisation of surfaces, the electrically active area of the microprobe must be diminished, and the positioning of the electrode absolute to the surface must occur completely independent of any current. This, however, requires a de-coupling of the distance information and the electrochemical signal as a precondition. The topographical information should be ensured with as high a resolution as possible.

It is an object of the present invention to provide a device which allows for a simultaneous, yet mutually decoupled, direct determination of topology and electrochemical activity. The shape of the device or of the ultramicroelectrode integrated therein or combined therewith, the electrically active area and the ratio of electrode area to the distance to the surface shall be variable. In particular, a method of producing such device is to be provided which is highly reproducible, allows for a simple serial production and an optimum measurement performance.

According to the invention, this object is achieved by a method of producing a device for simultaneously carrying out electrochemical and a topological near field microscopy, wherein a probe suitable for topological imaging by near field technology is covered by a conductive material, the conductive material is covered by an insulating layer, and the conductive material and the insulating layer are removed in the region of the immediate tip of the probe. With the present method not only a suitable device can be provided which allows for electrochemical examinations of surfaces with a simultaneous determination of the surface topology, but according to the invention the highly reproducible production of this measuring device is enabled by an amazingly simple method. The method according to the invention can also be easily included in already existing manufacturing processes, since, e.g., conventional topological near field probes can be used as the starting material. By the method according to the invention it is ensured that the region for the electrochemical near field measurement of the device which is defined by the conductive material which is capable of receiving the signals obtained from the sample surface after the insulating layer has been removed, does not extend as far as to the outermost tip of the device, but starts at a defined distance from the immediate tip of the device (on which the interaction for the topological examination of the surface takes place). In this manner, not only the danger of a contact of the electrochemical near field measurement device with the surface is prevented, but also a negative influence on the topological near field measurement.

General illustrations of various techniques applicable within the scope of the present invention for topographical and electrochemical near field microscopy (scanning probe microscopy) can be found in Bottomley (Anal. Chem. 70 (1998), 425R–475R) and in Wiesendanger (Scanning Probe Microscopy and Spectroscopy (Methods and Application) (Ed. R. Wiesendanger), Cambridge Press (1994)), which are included herewith as disclosure.

What is essential to the method according to the invention is that, starting from a probe suitable for topological near field measurement, by applying and insulating a conductive material, the electrochemical near field measurement can be combined with the topological near field measurement in a simple manner. By removing conductive material and insulating layer in the region of the immediate tip of the device, not only the functioning ability of the (probe) tip required for the topological near field measurement is restored again, but also a region is created with which the conductive material is made accessible again for measuring surface effects in the electrochemical near field. The insulating layer applied over the conductive material has the effect that the signals will only enter via regions which have deliberately been bared again.

Thus, it is essential that the region for electrochemical near field microscopy is created by covering the device for topographical near field measurement ("tip", "cantilever") with a conductive material. Such covering may be complete ("envelope"), yet it is also possible to cover merely certain areas of the device for topographical near field measurement (e.g. in the form of conductive tracks along the longitudinal axis of the cantilever) with a conductive material.

In case that the device for topographical near field measurement itself is conductive (e.g. in the scanning tunneling microscope tip; "scanning tunneling microscopy" (STM); or in scanning near field optical microscopy (SNOM) tips)), this conductive device itself must, of course at first be insulated in the device according to the invention, and on this insulating layer, the conductive material for the electrochemical near field measurement must be present. In this instance, the insulated form of the device for topographical near field measurement is (at least partially) covered with the conductive material so as to provide the device for electrochemical near field measurement which, in turn, then must also be insulated (with the exception of the measurement region).

This insulation of the device according to the invention is essential since the electrochemical near field measurement always must be performed in a liquid medium (electrolyte; liquid, conductive phase), and accordingly those parts of the device for the electrochemical near field measurement which do not serve for the immediate measurement ("measurement area") must be protected against the liquid medium present during the measurement, which medium, as a rule, covers the surface to be measured, so as to avoid any undesired influences on this measurement.

The manner in which the topological near field probe is covered with the conductive material is not critical. In general, for reasons of process technology, it will be preferred for the topological near field probe to be enveloped with the conductive material. It is, however, also possible to provide, e.g., merely one side of the probe with the conductive material. What is essential is only that the conductive layer is supplied from the region in which the electrochemical near field interaction with the surface is to be measured, to a suitable site of contact in another region of the electrode, from which site the measurement signal can be taken.

The preferred conductive materials are either metals or they contain a metallic component, in particular a transition metal, the use of gold, silver, platinum, palladium, tungsten, cadmium, aluminum, rhodium, iridium, copper, mercury alloys, a platinum-iridium-alloy, a platinum-rhodium-alloy, carbon, carbon electrode-glassy carbon, high-order pyrolytic graphite (HOPG) being particularly preferred. Furthermore, also materials, such as polysilicon, e.g., doped, metal nitrides (TiN, TaN, . . . ) or all silicides (tungsten silicide, tantalum silicide, . . . ) may be considered as preferred materials.

The manner in which the probe suited for topological near field measurement is covered with the conductive material is not critical and will depend on the respective material to be applied. Particularly suitable methods comprise ion sputtering, electron sputtering, chemical vapor deposition (CVD), electroless plating, electroplating and so on, in individual cases, however, also liquid phase deposition processes and spincoating methods may, advantageously, be used.

The covering of the layer of conductive material with the insulating layer preferably is effected by deposition from the gas phase, by a CVD process, in particular, however, also by a plasma-supported CVD process, ion sputtering, electron sputtering, electroless plating, electroplating and application of insulating polymer layers, yet in individual cases also liquid phase deposition processes and spincoating methods are conceivable. With the insulation it must be ensured that the conductive material is completely covered so that the conductive material (except for the measurement region bared later on) does not have any contact to the electroactive medium.

The baring of a certain region of the conductive layer is effected by the intentional removal of the insulating layer and the layer of conductive material. The removal of the conductive material and/or the removal of the insulating layer preferably are effected by a focussed ion beam, optionally a neutral particle beam, by an etching process, by laser or by focussed electromagnetic waves, removal by focussed ion beam being particularly preferred (cf. e.g. Matsui et al., Nanotechnology 7 (1996), 247–258).

According to the invention, the inventive device may also be equipped with further layers or with different layer sequences, and be provided with a modified electrode which is designed as a microbiosensor, such as, e.g., as enzyme electrode, pH sensitive ultramicroelectrode, potentiometric or amperometric ultramicroelectrode, ion-sensitive ultramicroelectrode, ionselective ultramicroelectrode, polymer-modified ultramicroelectrode, biomimetic ultramicroelelctrode. The number and arrangement of the various regions for the electrochemical near field measurement in such a multielectrode and multisensor configuration accordingly can be increased deliberately, by varying this layer sequence and the number of layers so as to enable multiparameter measurements, such as, e.g., simultaneous, electrochemical, topographical and pH mapping.

Furthermore, also several tips may be provided for topographical near field measurement, or several combination device according to the invention may be provided for topographical and for electrochemical near field measurement in one and the same device, respectively.

A preferred variant of the method according to the invention thus relates to a method in which a conductive material is once more applied to the insulating layer which conductive material is covered by an insulating layer, and this application of conductive material and covering with an insulating layer optionally is repeated further times before the various conductive layers are bared again in the measurement region.

The probe usable for the topological near field measurement as the base body of the inventive ultramicroelectrode preferably is a probe made of metal, of an insulator, of a semiconductor, of a fiber-optic light guide or of a wave guide. If the probe is an electric conductor, it must first be provided with an insulating layer, whereupon the method according to the invention can be carried out.

Dimensioning of the layers (by which substantially the region is defined, in which the electrochemical near field effects are measured) will depend on the respective field of use and/or the resolution ability of the inventive device; accordingly, preferably the conductive material will be applied to have a thickness of from 10 to 2000 nm, preferably from 100 to 800 nm, in particular from 150 to 500 nm. What is also conceivable is a monoatomic or monomolecular conductive layer.

Preferably, the insulating layer will be applied to have a thickness of from 50 to 5000 nm, preferably from 100 to 2000 nm, in particular from 500 to 1500 nm. Here, too, however, also monoatomic or monomolecular layers are conceivable.

The region in which the conductive material and the insulating layer are removed will also depend on the planned field of application of the device according to the invention and its measurement characteristics, respectively, and will also depend on the respective method of removing these layers. Preferably, a region from the immediate tip as far as to a distance from the immediate tip of from 10 to 2000 nm, preferably from 50 to 1000 nm, in particular from 100 to 500 nm is removed, wherein in each individual case the particular geometry of the probe, forming the basis from which it is started out with, must be taken into consideration.

Preferably, it is already provided in the inventive production method itself that suitable connecting devices are provided at the device for recording the measurement signals.

In a further aspect, the present invention relates to a device which can be obtained according to the present method.

Thus, with the device according to the invention, both the electrochemical examination of surfaces and also the determination of the surface topology is possible simultaneously and with high resolution at the same site.

Figure 1:
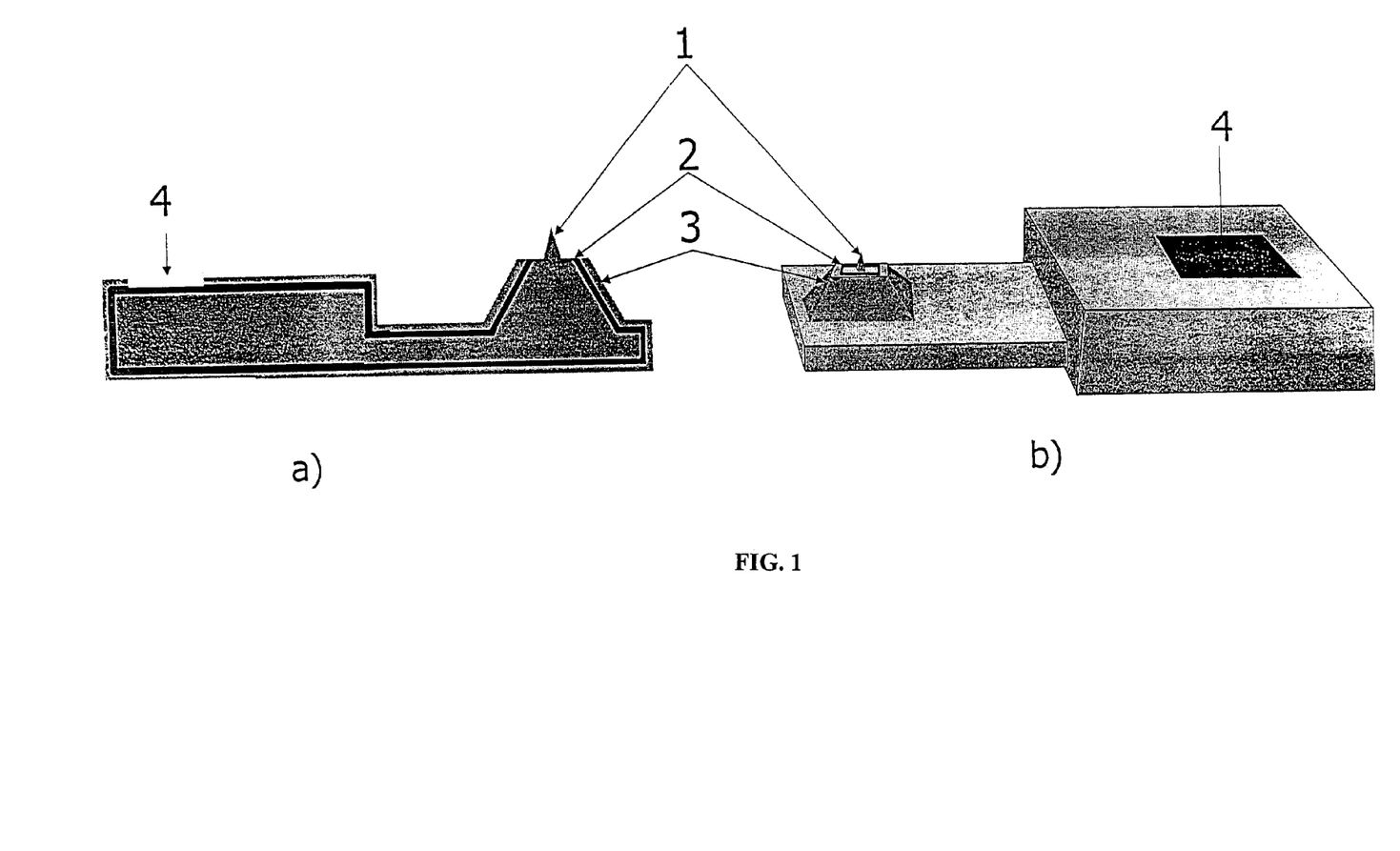
FIG. 1 shows a principle outline of the measurement device according to the invention in a) schematic cross-section and b) schematic perspective view.

One possible embodiment of the arrangement according to the invention is schematically illustrated in FIG. 1. It consists of the following main elements:

(i) an insulated measurement tip (1) for topology examination;
(ii) an ultramicroelectrode (2) surrounding the measurement tip;
(iii) an insulated jacket (3) which electrically insulates the measurement probe with the exception of the measurement tip, the ultramicroelectrode and the connection area;
(iv) a connecting face (4) electrically conductively connected with the ultramicroelectrode.

In the measurement tip according to the invention, the measurement tip (1) which serves to map the surface topography consists of $Si_3N_4$, yet with the present method it may be produced of any material. The height and shape of the measurement tip can be varied. Typical dimensions, without restriction of the generality, are a height of 0.2 μm at a radius of curvature of the tips of <30 nm.

The geometry of the ultramicroelectrode may be varied controlledly in terms of shape and size. The distance of the electrode to the sample surface is adjusted by the height of the above-described measurement tip (i).

An insulating cover layer (iii), e.g. of, silicon nitride, covers the entire probe with the exception of the ultramicroelectrode, the connecting area and the measurement tip, and with the measurement tip according to the invention it is, e.g., a nitride layer having a thickness of 900 nm, which preferably is applied by means of CVD. Yet, also any other insulating layer which meets the requirements in terms of insulation, flexibility and resistance relative to the media used in the measurement is possible. This insulating layer must be sufficiently thick so as to guarantee an insulation, and sufficiently thin so as not to restrict the dynamic properties of the measurement tip.

Size and geometry (circular, elliptical, rectangular and also irregular electrode areas) of the electrically active area of the ultramicroelectrode can be produced and varied in controlled manner, just like the distance of the ultramicroelectrode from the surface and the relation of this distance to the electrically active area of the ultramicroelectrode.

The jacket of the device produced according to the invention is electrically insulating and chemically inert relative to the solutions used during measurement in liquid media.

The invention will be explained in more detail by way of the following exemplary embodiments as well as the drawing figures to which, however, it is not restricted.

Therein.

EXAMPLE

Production of the Inventive Device Comprising an Integrated Ultramicroelectrode

Figure 2:
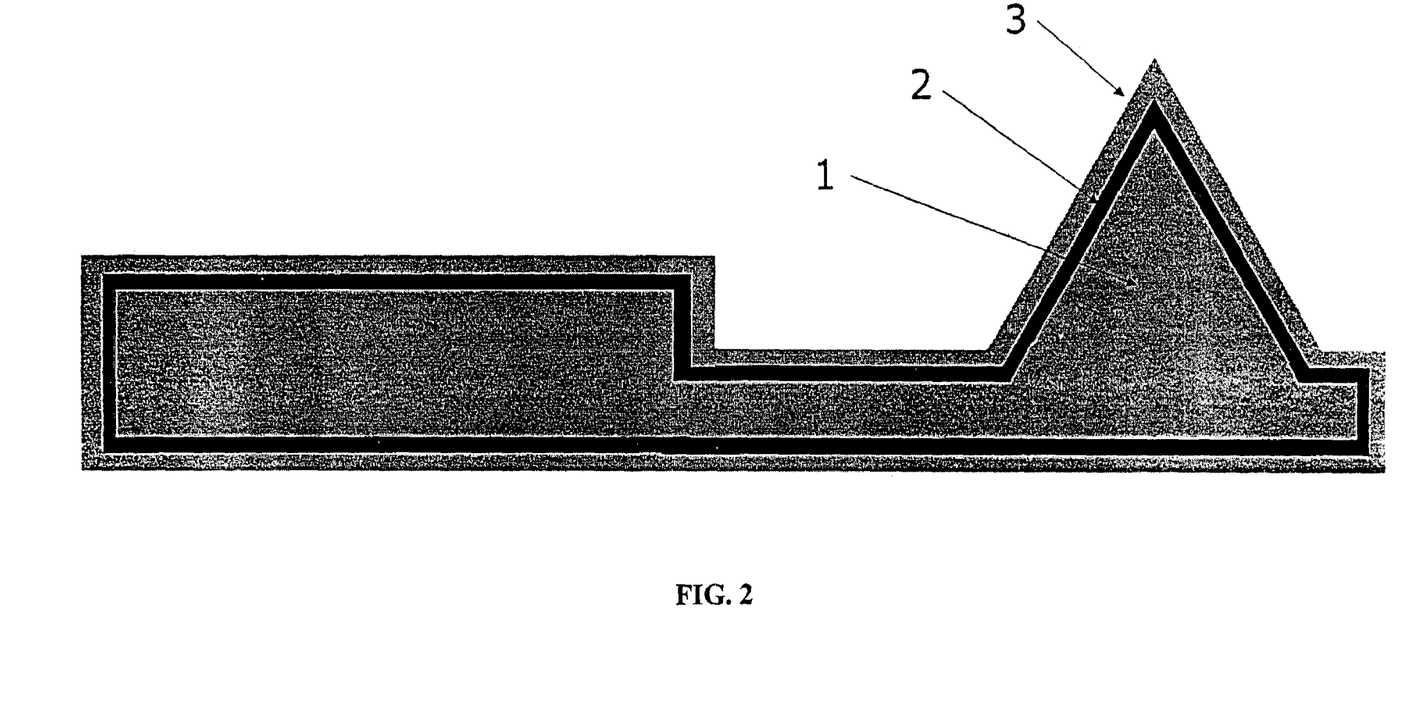
FIG. 2 shows a principle outline to describe the production method according to the invention.

The device according to the invention can advantageously be produced with a method according to the invention as will be described in more detail in the following. The production method illustrated in the attached principle outlines (FIGS. 2 to 5) substantially comprises the following steps:

In a device according to the invention with an integrated ultramicroelectrode, in the examplary embodiment there is a base body at first in the form of an $Si_3N_4$ cantilever (FIG. 2(1)). Onto the latter, a conductive layer is applied, in the exemplary embodiment 200 nm of gold are sputtered thereon. The electrically conductive layer is covered with an insulating layer which must be resistant to the solutions used during measurements in liquid media (FIG. 2(3)). In the measurement device according to the invention, e.g. a silicon nitride layer having a thickness of 900 nm has been deposited e.g. by means of a plasma-supported CVD process.

Figure 3:
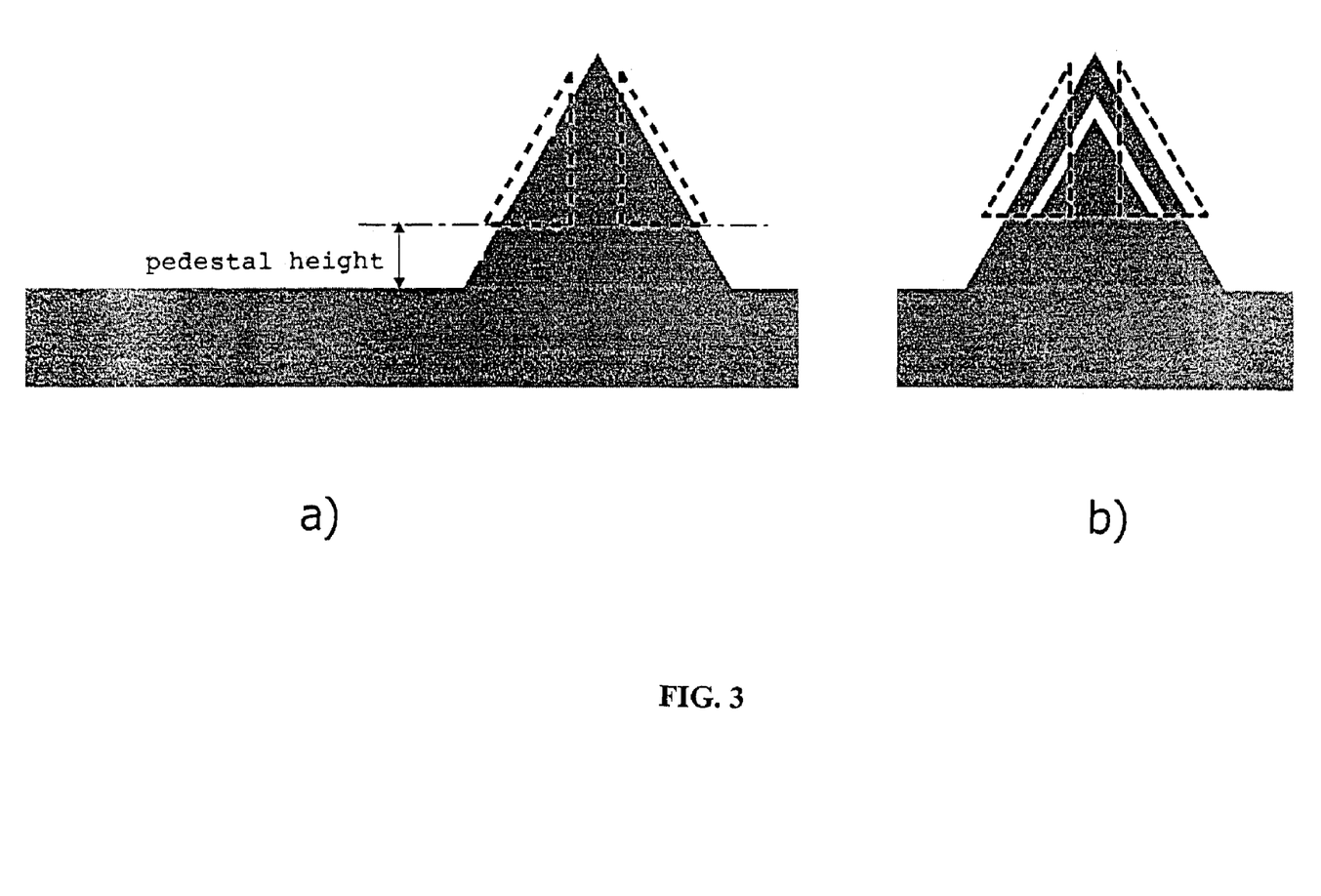
FIG. 3 shows a principle outline to describe the production method according to the invention, a) view of a side face, and b) view of an end face.

In the next step, the outer insulating layer covering the electrode and a part of the electrode and of the base body is locally removed (regions indicated in broken lines in FIG. 3) by means of a material-removing method, preferably with a focussed ion beam arrangement, as illustrated in FIG. 3. This process is carried out once, from the side face (FIG. 3a) and once, offset by 90° thereto, from the end face (FIG. 3b).

Figure 4:
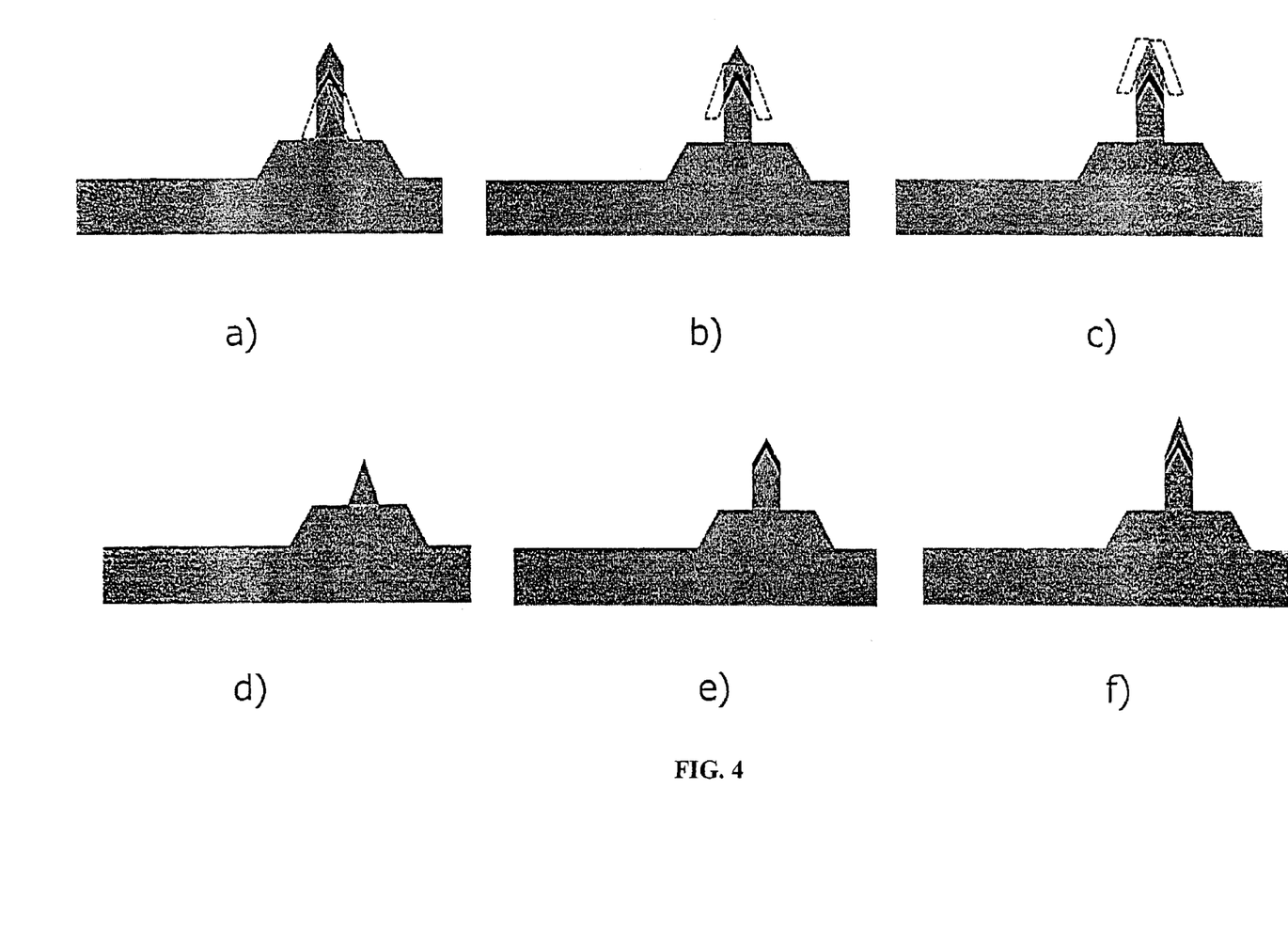
FIG. 4 shows a principle outline of the measurement device according to the invention.
Figure 5:
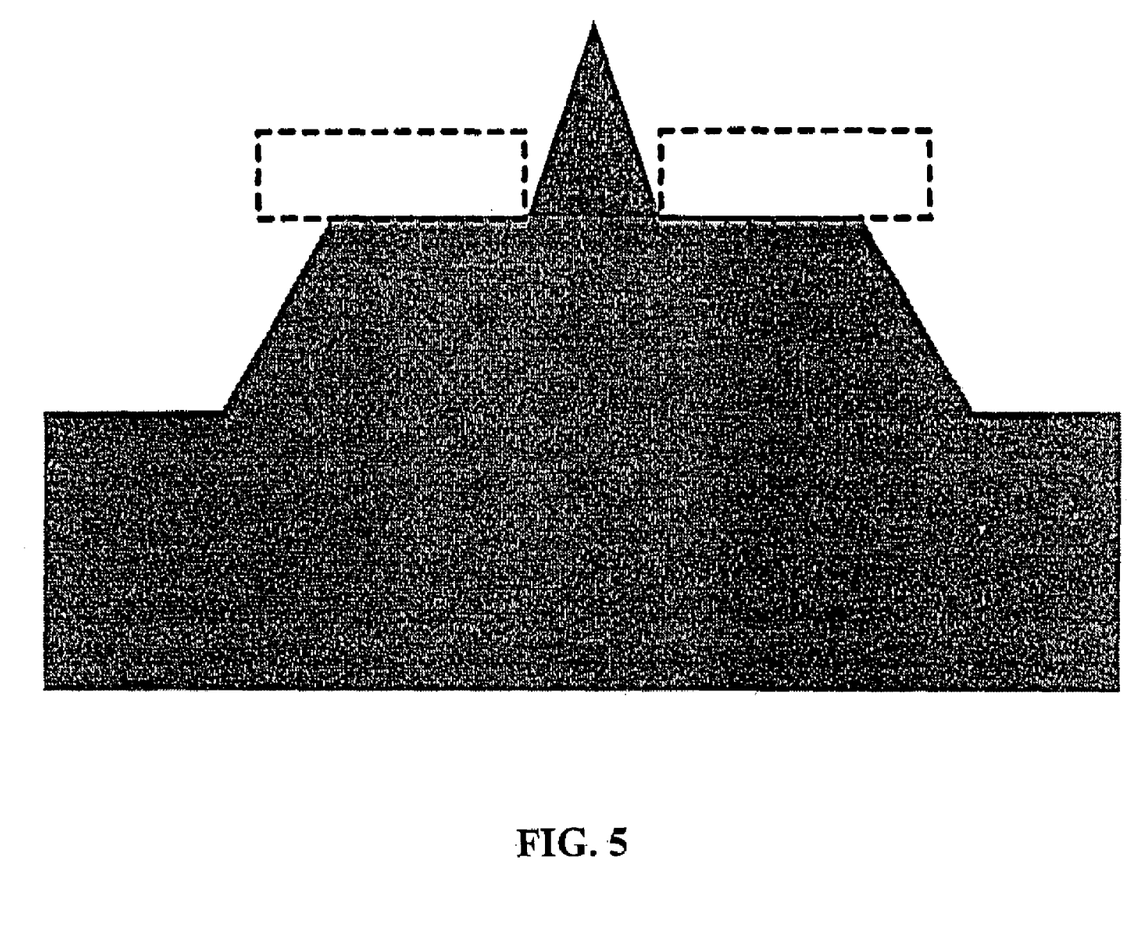
FIG. 5 shows a principle outline to describe the production method according to the invention.

From the remaining cuboid with the pyramid put thereupon and having the material sequence insulator-metal-insulator, a new measurement tip is formed, preferably by means of the focussed ion beam device as in the previous method step, by removing the regions indicated in broken lines in FIG. 4, once from the side face and once from the end face.

According to the invention, the measurement tip may be formed by a suitable selection of the material removal from the material of the base body (FIG. 4a), the conductive layer (FIG. 4b) or the insulating layer covering the metal (FIG. 4c). Illustrations d, e and f in FIG. 4 show the resultant tip configurations.

The height of the tip, the radius of the tip and the shape of the tip can also be varied by a suitable selection of the material removal. In the exemplary embodiment, the measurement tip consists of the material of the cantilever used.

Finally, the electrode areas in the exemplary embodiment are cleaned by a special form of material removal from re-deposited material with the FIB (single pass mill). In this single pass mill, the material-removing ion beam scans the region indicated in FIG. 5 in broken lines just once, from top to bottom, so that finally the sample surface is sputtered by the ion beam just once and re-deposited material is removed thereby.

According to the invention, however, any other method that cleans the surface while maintaining the structure, such as, e.g., an etching process, may be used for cleaning the electrode areas.

Contacting the ultramicroelectrode may take place at any point desired, by locally removing the uppermost insulating layer by a structuring method and baring a respective connecting contact to the conductive layer.

In the above exemplary embodiment, contacting of the ultramicroelectrode is effected at the rear end of the glass body of the cantilever (FIG. 1).

From the method according to the invention, there result, e.g., the following possibilities of varying the electrode area or geometry, or the ratio of electrode area to the distance of the electrode from the sample surface and the lateral distance of the electrode (of the region for the electrochemical near field measurement) from the measurement tip (the region for topological near field measurement):

1. By applying electrically conductive layers of different thicknesses, the electrically active area of the probe can be varied independently of the pedestal height entered in FIG. 3.
2. With a fixed thickness of the electrically conductive layer, as is the case in the exemplary embodiment, with a pyramid-shaped base body, the electrode areas can be diminished for greater pedestal heights (FIG. 3).
3. The geometry of the electrode can be varied by the choice of the base body on which the electrically conductive layer is applied. In the exemplary embodiment, a cantilever was used with whose pyramid-shaped tip a suqare frame electrode results—as is apparent from FIG. 1. According to the invention, however, a base body of any desired shape may be used as the starting material, and thus, e.g., circular, elliptic, rectangular or polygonal electrodes can be realized. With the focussed ion beam device used in the exemplary embodiment, just as in any suitable structuring method, any desired—also irregular—shape of the base body can be provided, whereby it becomes possible to realize non-closed, in particular also segmented, ultramicroelectrodes.
4. The ratio electrode area/distance of the electrode to the sample surface can be varied by adjusting the height of the measurement tip.
5. The lateral distance of the microelectrode from the measurement tip for determining the surface topology may, as in the exemplary embodiment, be determined by the pedestal height (FIG. 3), with the base body having an appropriate shape.

Figure 6:
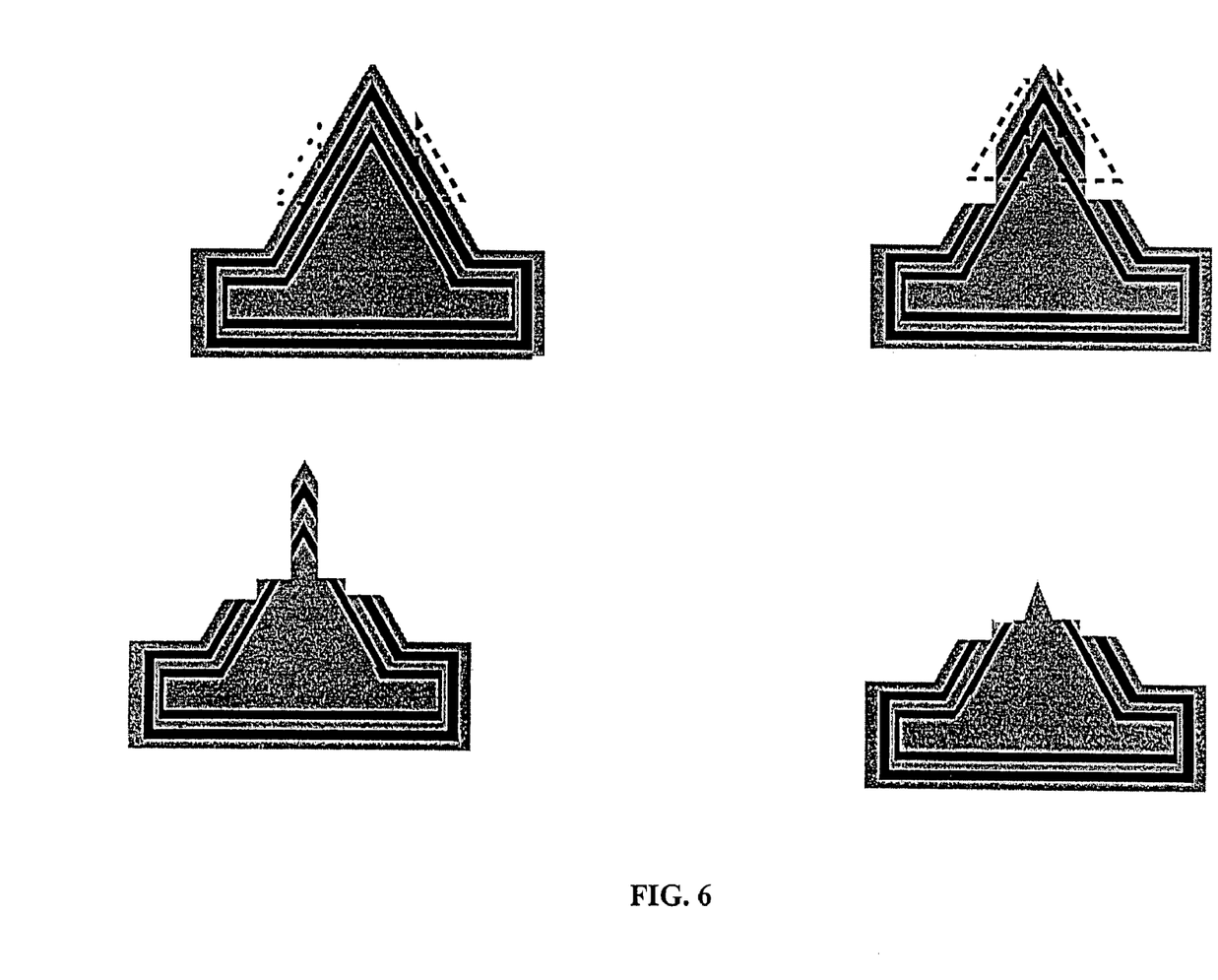
FIG. 6 shows a principle outline to describe the production method according to the invention for multielectrodes.

In terms of number of layers and sequence of layers, the method according to the invention is not limited. By an alternating coating of the insulating base body with conductive and insulating layers and, analogous to the exemplary embodiment, subsequent local removal of the material, thus also multielectrodes can be produced. The distances of the individual electrodes to the sample surface may vary. As an example, FIG. 6 shows an exemplary embodiment for a double electrode. For a probe according to the invention comprising several integrated electrodes, the method described will apply with the modification that the material-removing step can be carried out twice with different pedestal heights (FIG. 6). The production of the measurement tip proper and the removal of redeposited material from the electrode is carried out analogously to the above-described exemplary embodiment.

Figure 7:
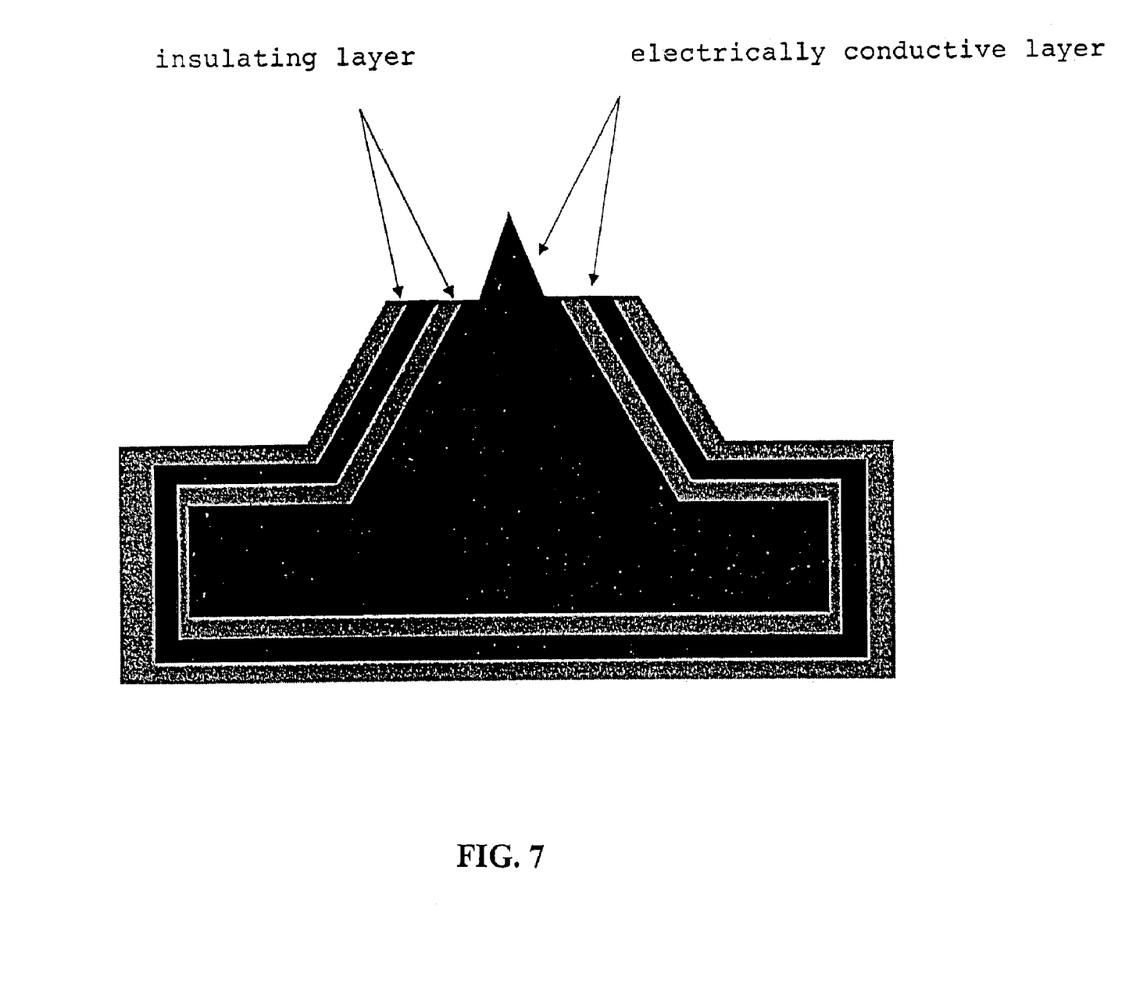
FIG. 7 shows a principle outline to describe the production method according to the invention for multielectrodes comprising an electrically conductive measurement tip.

If an electrically conductive material is used as the base body, a double electrode will be obtained by a series of structuring depositing and etching steps, with the measurement tip itself now being electrically conductive (FIG. 7).

In this case, any desired multilayer systems can be built up and thus, multielectrodes can be realized.

Any material may be used as the base body of the probe, in particular also fibre-optic guides and, generally, wave guides for electromagnetic waves. In this instance, e.g., a light beam (general electromagnetic waves) can be guided as far as to the probe tip and onto the sample. Moreover, also an external jacket layer may in this way be used as a wave guide or as a fiber-optic wave guide.

The invention claimed is:

1. A method of simultaneously carrying out an electrochemical and a topographical near field microscopy, comprising:
   obtaining a probe suitable for topological near field microscopy that has been made by a process comprising covering the probe with at least a first layer of conductive material;
   covering the conductive material with at least a first insulating layer; and removing the conductive material and the insulating layer in a region of the immediate tip of the probe, wherein the probe has a bared measurement region starting at a defined distance from the immediate tip of the device; and
   simultaneously carrying out an electrochemical and a topographical near field microscopy procedure with said probe.

2. The method of claim 1, wherein the probe is enveloped with the conductive material.

3. The method of claim 1, wherein the conductive material is a metal or metal alloy.

4. The method of claim 3, wherein the conductive material comprises gold, silver, platinum, palladium, tungsten, cadmium, aluminum, rhodium, iridium, copper, mercury alloys, a platinum-iridium-alloy, a platinum-rhodium-alloy, carbon, carbon electrode-glassy carbon, a high-order pyrolytic graphite (HOPG), a polysilicon, a doped polysilicon, a metal nitride, or a silicide.

5. The method of claim 4, wherein the conductive material comprises a metal nitride further defined as TiN or TaN.

6. The method of claim 4, wherein the conductive material comprises a silicide further defined as tungsten silicide or tantalum silicide.

7. The method of claim 1, wherein the covering of the probe with the conductive material comprises ion sputtering, electron sputtering, a chemical vapor deposition (CVD) process, electroless plating, electroplating, a liquid phase deposition process or a spincoating method.

8. The method of claim 1, wherein the covering of the layer of conductive material with the insulating layer comprises deposition with a gas phase (CVD process), ion sputtering, electron sputtering, electroless plating, electroplating, application of insulating polymer layers, a liquid phase deposition process, or a spincoating method.

9. The method of claim 8, wherein the covering of the layer of conductive material with the insulating layer is further defined as comprising deposition with a plasma-supported CVD process.

10. The method of claim 1, wherein removing the conductive material and/or the insulating layer comprises using a focused ion beam, an etching process, a laser, or focused electromagnetic waves.

11. The method of claim 10, wherein removing the conductive material comprises using a focused ion beam further defined as a neutral particle beam.

12. The method of claim 1, further comprising:
   covering the at least first insulating layer with at least a second layer of a conductive material; and
   covering the second layer of conductive material with at least a second insulating layer.

13. The method of claim 12, further defined as comprising applying multiple additional layers of conductive material and insulating layers.

14. The method of claim 1, wherein the probe is further defined as being of metal, an insulator, a semiconductor, a fiber-optic light guide, or of a wave guide.

15. The method of claim 1, wherein the conductive material is applied to a thickness of from 10 to 2000 nm.

16. The method of claim 15, wherein the conductive material is applied to a thickness of from 100 to 800 nm.

17. The method of claim 16, wherein the conductive material is applied to a thickness of from 150 to 500 nm.

18. The method of claim 1, wherein the insulating layer is applied to a thickness of from 5 to 5000 nm.

19. The method of claim 18, wherein the insulating layer is applied to a thickness of from 100 to 2000 nm.

20. The method of claim 19, wherein the insulating layer is applied to a thickness of from 300 to 1500 nm.

21. The method of claim 1, wherein the conductive material and the insulating layer are removed in a region which extends from the immediate tip a distance of from 10 to 2000 nm.

22. The method of claim 21, wherein the conductive material and the insulating layer are removed in a region which extends from the immediate tip a distance of from 50 to 1000 nm.

23. The method of claim 22, wherein the conductive material and the insulating layer are removed in a region which extends from the immediate tip a distance of from 100 to 500 nm.

24. The method of claim 1, wherein suitable connecting devices are provided at the device for recording the measurement signals.

25. The method of claim 1, wherein the layer of conductive material and/or the insulating layer is formed as a monoatomic or monomolecular layer.

26. The method of claim 1, wherein removing the conductive material and/or the insulating layer bares an area of the probe in a circular, elliptic, rectangular or irregular shape.

* * * * *